United States Patent [19]

Hida et al.

[11] Patent Number: 4,467,426

[45] Date of Patent: Aug. 21, 1984

[54] AIR LUMBAR SUPPORT

[75] Inventors: Takashi Hida; Katsuki Takayama; Kazutaka Kuwana, all of Aichi, Japan

[73] Assignee: Aisin Seiki Kabushiki Kaisha, Kariya, Japan

[21] Appl. No.: 279,419

[22] Filed: Jul. 1, 1981

[30] Foreign Application Priority Data

Jul. 25, 1980 [JP] Japan .............................. 55-102112

[51] Int. Cl.³ ....................... G06F 15/20; F16M 13/00
[52] U.S. Cl. ..................................... 364/424; 248/575
[58] Field of Search ............. 364/424, 425; 296/65 R; 297/346; 248/560, 566, 575; 318/466, 467; 200/1 R, 153 R, 153 A, 153 L, 153 P

[56] References Cited

U.S. PATENT DOCUMENTS

| | | | |
|---|---|---|---|
| 3,601,351 | 8/1971 | Ambrosius | 248/566 |
| 3,814,370 | 6/1974 | Hurwitz | 248/575 |
| 4,194,716 | 3/1980 | Barecki et al. | 248/575 |
| 4,204,255 | 5/1980 | Cremer | 364/425 |

*Primary Examiner*—Errol A. Krass

*Attorney, Agent, or Firm*—Sughrue, Mion, Zinn, Macpeak, and Seas

[57] ABSTRACT

An air lumbar support is provided for establishing a desired attitude of a driver's seat of a vehicle, and is associated with an attitude control system. A pad of a seat back is supported by a plurality of air bags, each of which is connected with a solenoid valve, which when open, permits the air to be discharged into the atmosphere from the air bag. When a desired attitude is to be established, air under pressure is fed to the air bags. Attitude establishing data is in the form of a number of times the solenoid valves are energized for opening for short intervals, and is stored in a non-volatile semiconductor read-write memory if the attitude is to be registered. In response to a key operation, a microprocessor reads registered data automatically, initially driving an air pump, followed by opening the solenoid valves a number of times indicated by the data, thus establishing a desired air pressure in the air bag. In another embodiment, the solenoid valves are interposed between the air pump and the air bags.

9 Claims, 9 Drawing Figures

AIR LUMBAR SUPPORT

BACKGROUND OF THE INVENTION

The invention relates to a seat of a vehicle, in particular, to an air lumbar support which utilizes an air bag and an electronic control circuit which controls the pressure of the air bag in response to an electrical coded command.

A driver driving a vehicle normally operates a steering wheel, an accelerator and a brake pedal, a transmission and switches in suitable manners depending on the road condition, the weather and road marks. It will be noted that these members have their operating end fixed in position. By contrast, the physical features of drivers vary from driver to driver. Consequently, a lumbar support used in the prior art is usually adapted to have the resilience of the lumbar spring adjusted through a lever operation. In another lumbar support, air is pumped into an air bag through a manual pump or discharged therefrom through a manual release valve. As will be appreciated, a manual adjustment is cumbersome in any event. Pending U.S. patent application Ser. No. 235,173, filed Feb. 17, 1981, U.S. Pat. No. 4,404,632 discloses a seat back in which a motor is mounted to establish and adjust the resilience of a lumbar spring. However, a mechanism used to adjust the resilience of the lumbar spring is complex in construction, requiring a complex positioning control because of the need to use an encoder and a position sensor.

SUMMARY OF THE INVENTION

It is a first object of the invention to provide a lumbar support which permits a lumber position and a cushioning to be established in response to a key operation. A second object is to provide a lumbar support which permits a simple establishment and adjustment, and a third object is to provide a lumbar support in which a lumber position and a cushioning are both automatically established in accordance with a coded input once they have been established.

Above objects are achieved in accordance with the invention by providing a lumbar support including an air bag which is substituted for a lumbar spring, a solenoid valve for controlling the air pressure of the bag, an air pump and an electronic control unit. The control unit may comprise an electronic processor such as a microcomputer including a read-write memory and a read only memory and capable of a high level logical processing. The operational programs of the processor include the entry of information which is used to establish the attitude of the lumbar support in a manner corresponding to a driver's code, read-out of such information in response to an input code, and control of the solenoid valve in accordance with such information.

In a preferred embodiment of the invention, information which is used to establish the attitude of the lumbar support represents a number of times by which the solenoid valve is repeatedly energized for opening. In one embodiment, the solenoid valve is connected to the air bag for discharge purpose. After the air is injected into the bag to a given pressure, which may be equal to a discharge pressure of the air pump, for example, the solenoid valve is energized for opening a given number of times, thus establishing a desired pressure in the air bag. In another embodiment, the solenoid valve is interposed between the air bag and the air pump, and is energized for opening a given number of times to establish a pressure in the air bag. An air accumulator may be interposed between the air pump and the solenoid valve, as required. The electronic control unit counts the number of times the solenoid valve is energized for opening during the time the air pressure in the air bag is being adjusted, and responds to a store command by storing the number of times the solenoid valve has been operated, in a storage region of the memory specified by the key as lumber support establishing data. It also responds to an automatic establishment command by reading establishing data from a storage region of the memory specified by the key, and controlling the opening operation of the solenoid valve in accordance with such data to establish the pressure within the air bag.

Above and other objects and features of the invention will become apparent from the following description with reference to the drawings.

DESCRIPTION OF EMBODIMENTS

Figure 1:
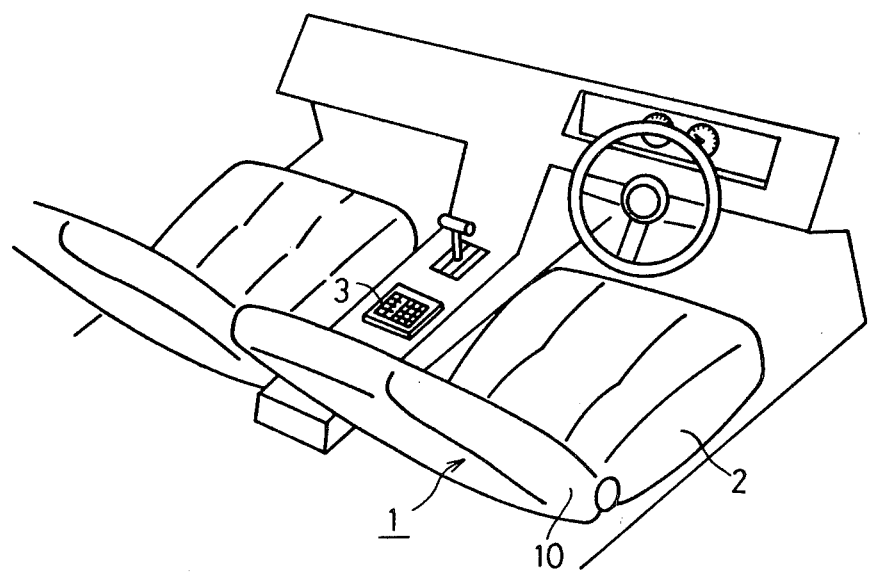
FIG. 1 is a perspective view of a driver's seat of a vehicle.

Referring to FIG. 1, there is shown a driver's seat of a vehicle in which one embodiment of the invention may be incorporated. In FIG. 1, a driver's seat 1 includes a seat body 2 and a seat back 10 which is angularly movable with respect to the latter. A control panel 3 is fixedly mounted in a console box. A lumbar support is mounted on the seat back 10, and is constructed as illustrated in FIG. 2.

Figure 2:
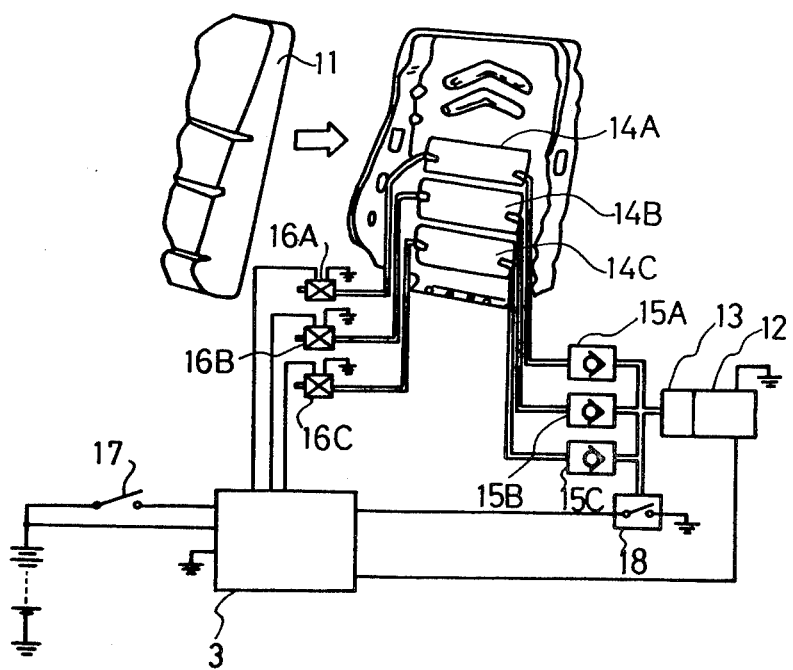
FIG. 2 is a block diagram of one embodiment of the invention, together with an exploded view of the seat back.

Referring to FIG. 2, the seat back 10 includes a pad 11 in which three air bags 14A, 14B and 14C are mounted and are connected to the discharge port of an air pump 13 which is driven by a motor 12, through check valves 15A, 15B and 15C, respectively. A pressure sensitive switch 18 is responsive to the pressure prevailing in the discharge port of the air pump 13 and becomes closed when the pressure exceeds a given value. The air bags 14A-14C are also connected to solenoid valves 16A, 16B and 16C, respectively, which serve as relief valves. The energization of these solenoid valves 16A to 16C are controlled by an electronic control unit which is contained in the control panel 3. It is to be understood that the solenoid valves 16A-16C are all constructed in an identical manner, and one of them, 16A, is shown in longitudinal section in FIG. 3.

Figure 3:
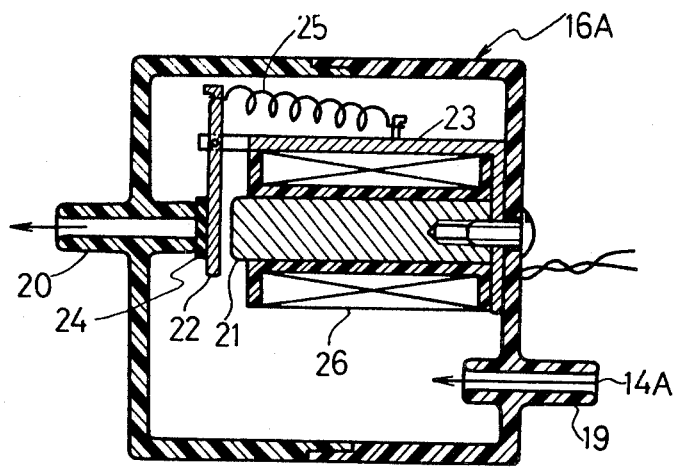
FIG. 3 is an enlarged logitudinal section of the solenoid valve shown in FIG. 2.

Referring to FIG. 3, the valve includes an air input port 19 connected to the air bag 14A, and an air output port 20 which is open into the atmosphere. The valve also includes a core 21 of magnetizable material which forms a closed magnetic path together with a movable iron piece 22, and a yoke 23 formed by a magnetizable material. A seal member 24 is bonded to the iron piece 22. A coiled tension spring 25 normally urges the iron piece 22 clockwise, whereby the seal member 24 integral with the iron piece 22 is urged against the inner opening of the output port 20 to shut off the interior of the solenoid valve 16A from the atmosphere. An electrical coil 26 is disposed on the core 21. When the coil 26 is energized, the iron piece 22 is attracted to the core 21, whereby the input port 19 communicates with the atmosphere through the output port 20.

Figure 4:
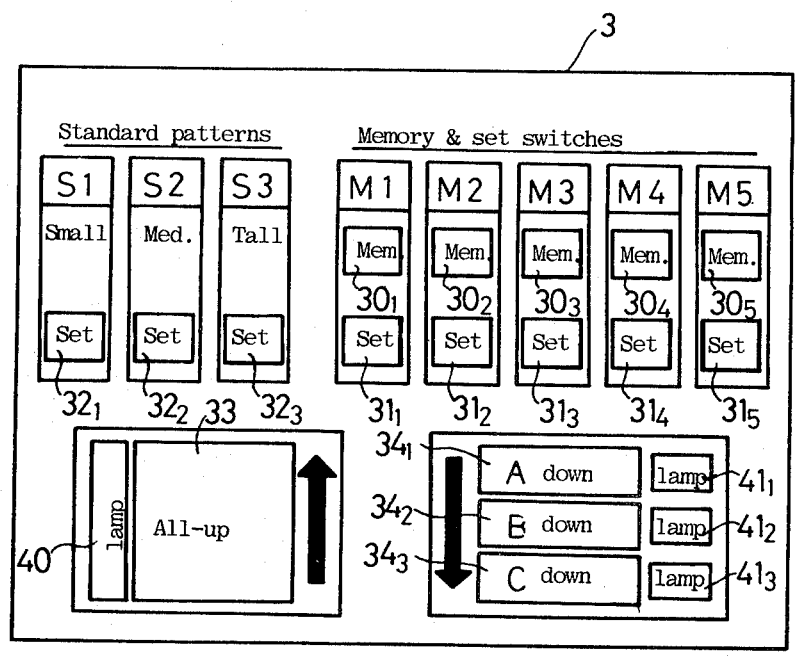
FIG. 4 is an enlarged plan view of the control panel shown in FIG. 2.

FIG. 4 shows the control panel 3 in plan view. Disposed on the inside of the panel surface are a plurality of keys and lamps including store keys $30_1$–$30_5$ producing a store or entry command, automatic set keys $31_1$–$31_5$ and $32_1$–$32_3$ producing an automatic cushion set command, all-up key 33 producing a drive command which is applied to the motor 12, relief keys $34_1$–$34_3$ producing an individual air discharge command to each of the air bags 14A–14C, and lamps 40 and $41_1$–$41_3$.

nected to amplifiers 63 and $64_1$–$64_3$, representing solenoid drivers and a motor driver, the output of which is effective to energize the associated solenoid valve and/or motor together with the lamps 40 and $41_1$–$41_3$.

ROM 52 store programs which effect a control of various parts as well as data read or write operation in response to the closure of the power switch 17, the closure of the pressure switch 18 and the operation of various keys mentioned above, and also store three sets of standard attitude establishing data. For the convenience of description to follow, it is assumed that the standard attitude establishing data is stored in various areas of the memory as indicated in Table 1 below.

TABLE 1

| Memory Areas | Standard attitude establishing data in ROM | |
|---|---|---|
| | Stored Content | Designation |
| ROM storage area 1 | The number of times 14A is operated for standard pattern S1 | S1-SOLA memory |
| ROM storage area 2 | The number of times 14B is operated for standard pattern S1 | S1-SOLB memory |
| ROM storage area 3 | The number of times 14C is operated for standard pattern S1 | S1-SOLC memory |
| ROM storage area 4 | The number of times 14A is operated for standard pattern S2 | S2-SOLA memory |
| ROM storage area 5 | The number of times 14B is operated for standard pattern S2 | S2-SOLB memory |
| ROM storage area 6 | The number of times 14C is operated for standard pattern S2 | S2-SOLC memory |
| ROM storage area 7 | The number of times 14A is operated for standard pattern S3 | S3-SOLA memory |
| ROM storage area 8 | The number of times 14B is operated for standard pattern S3 | S3-SOLB memory |
| ROM storage area 9 | The number of times 14C is operated for standard pattern S3 | S3-SOLC memory |

It is to be understood that standard patterns S1–S3 correspond to ranges of the stature less than 150 cm, from 150 to 170 cm and above 170 cm.

For the convenience of description, it is assumed that of the contents stored in N-RAM 53, air pressure establishing data (or the number of times the solenoid valve is operated) is stored in those areas as indicated in Table 2 below.

TABLE 2

| Memory Areas | Establishing data in RAM | |
|---|---|---|
| | Stored Content | Designation |
| RAM storage area 1 | The number of times 14A is operated for stored pattern M1 | M1-SOLA memory |
| RAM storage area 2 | The number of times 14B is operated for stored pattern M1 | M1-SOLB memory |
| RAM storage area 3 | The number of times 14C is operated for stored pattern M1 | M1-SOLC memory |
| RAM storage area 4 | The number of times 14A is operated for stored pattern M2 | M2-SOLA memory |
| . | . | . |
| . | . | . |
| . | . | . |
| RAM storage area 12 | The number of times 14C is operated for stored pattern M4 | M4-SOLC memory |
| RAM storage area 13 | The number of times 14A is operated for stored pattern M5 | M5-SOLA memory |
| RAM storage area 14 | The number of times 14B is operated for stored pattern M5 | M5-SOLB memory |
| RAM storage area 15 | The number of times 14C is operated for stored pattern M5 | M5-SOLC memory |
| RAM storage area 16 | The number of times 14A is operated | SOLA register |
| RAM storage area 17 | The number of times 14B is operated | SOLB register |
| RAM storage area 18 | The number of times 14C is operated | SOLC register |

Figure 5:
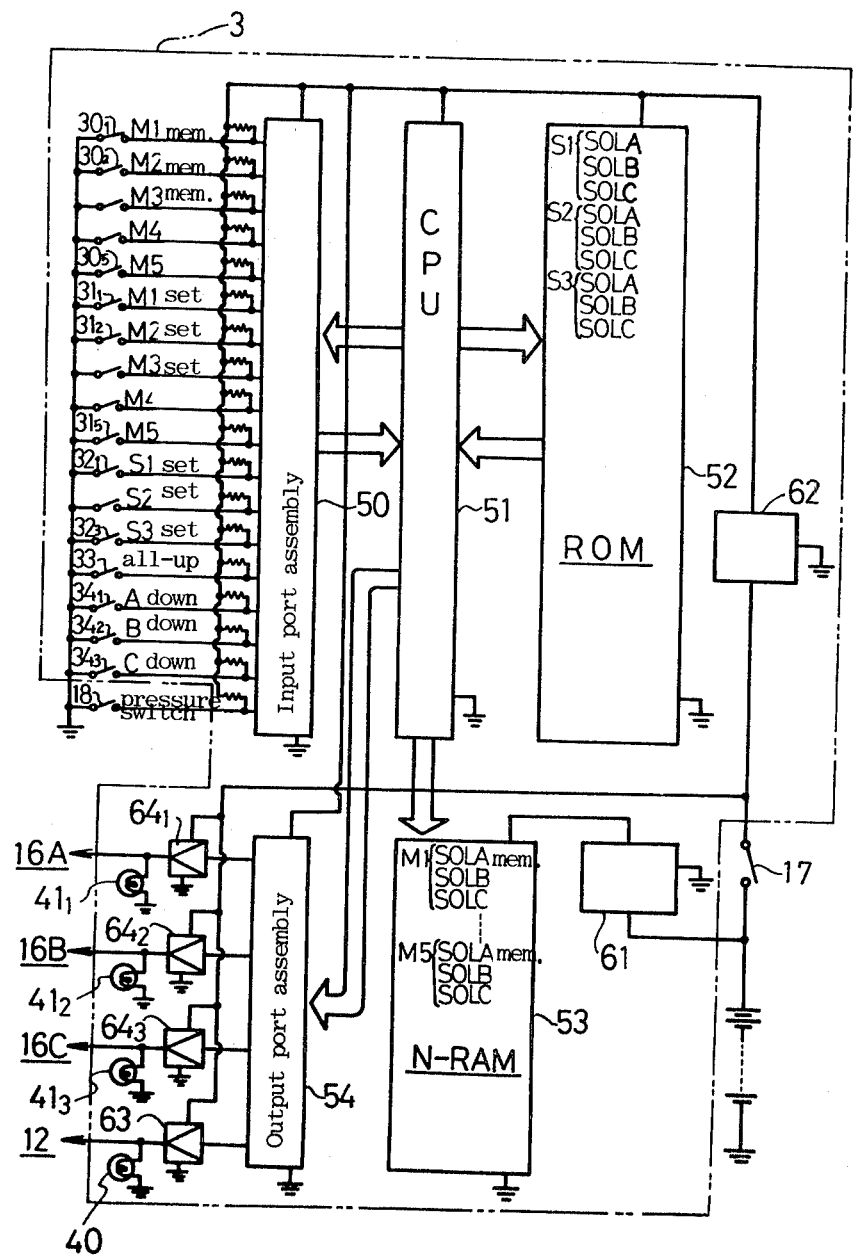
FIG. 5 is a block diagram illustrating various combinations of electrical components within the control panel.
Figure 6A:
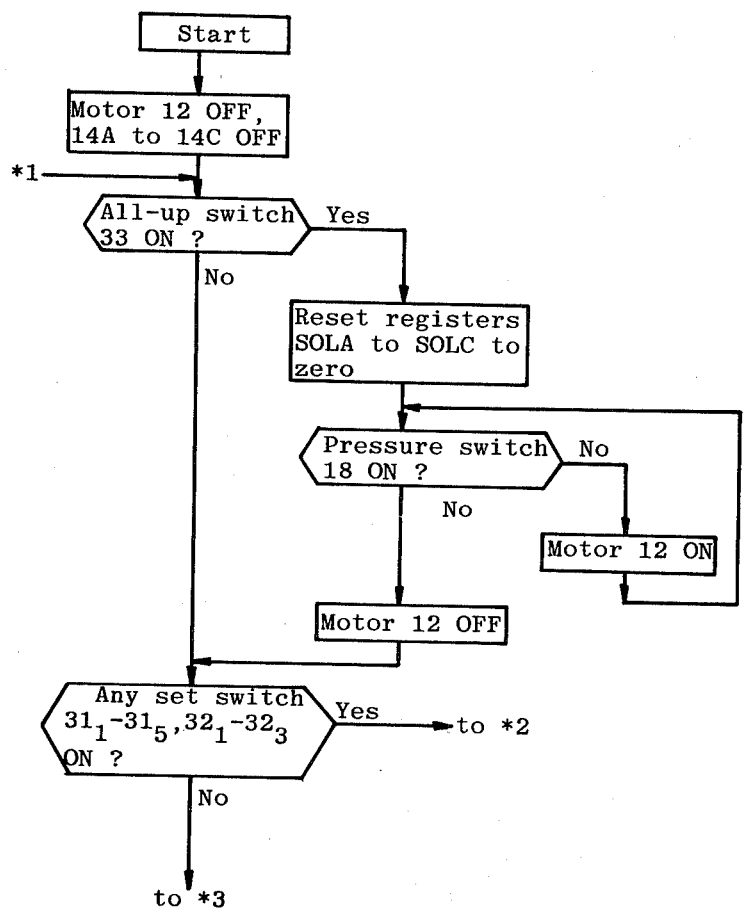
FIGS. 6a, 6b and 6c are flow charts illustrating the operation of the electronic control unit which is formed by the combinations of the components shown in FIG. 5.
Figure 6B:
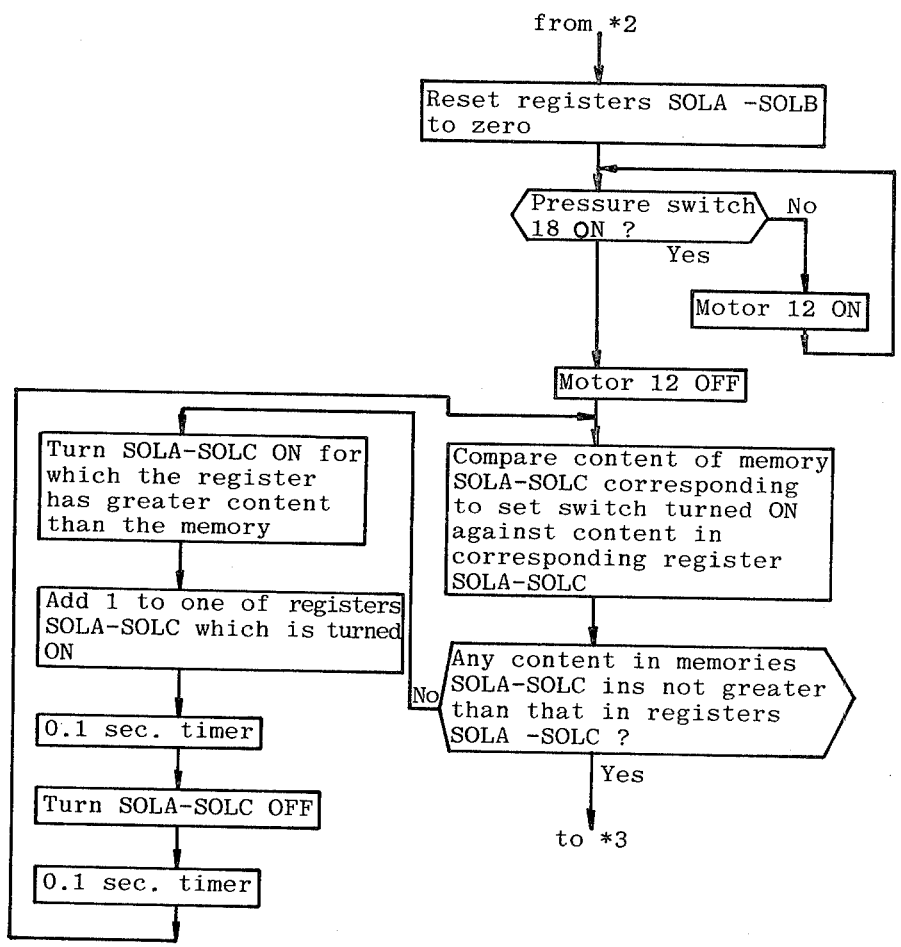
Figure 6C:
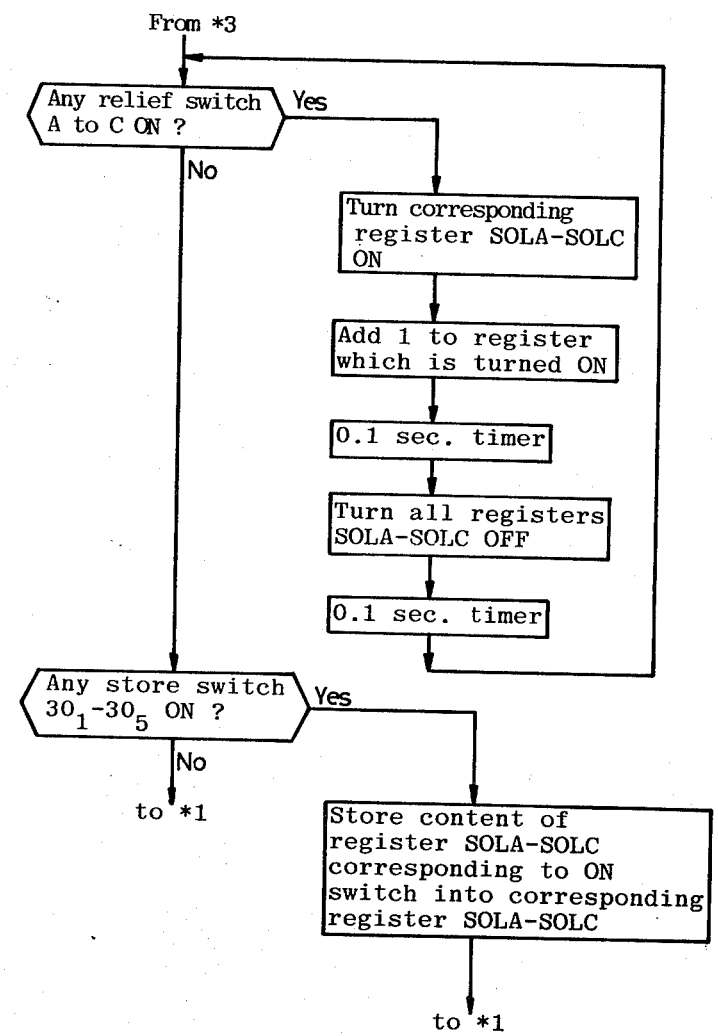

Various combinations of electrical components located within the control panel 3 are shown in FIG. 5. Of these electrical components, an input port 50, a central processing unit (CPU) 51, a semiconductor read only memory (ROM) 52, a non-volatile semiconductor read-write memory (N-RAM) 53 and an output port 54 constitute together a microcomputer, which represents the electronic control unit used in the present embodiment. A constant voltage is normally applied to N-RAM 53 from a constant voltage circuit 61 which is normally connected to the battery of the vehicle, whereby data stored in N-RAM 53 is maintained if an engine key is withdrawn from the vehicle. A constant voltage is applied to other computer elements through a power switch 17 which is closed by the engine key, and through a constant voltage circuit 62. Ports of the output port assembly 54 which are used to energize the solenoid valves 16A–16C and the motor 12 are con- FIGS. 6a to 6c illustrate a flow chart of an air pressure control by the electronic control unit (50–54) in accordance with programs stored in ROM 52. The operation of the control unit will now be described with reference to this flow chart.

When the control unit (50–54) is turned on or the switch 17 is turned on, various parts thereof are initialized, and the output port 54 operates to deenergize the motor 12 and all of the solenoid valves 16A–16C, and the control unit waits for a key input. When the key switch 33 is turned on under this power on condition ("all-up switch 33 on?"=YES), registers SOLA-SOLC in RAM 53 which store the number of times the solenoid valves are to be energized are all cleared or reset to zero (solenoid valve deenergized; "0"), while the motor 12 is energized to drive the air pump 13. Since all of the solenoid valves 16A–16C are closed under this condition, the pump 13 feeds air to the air bags 14A–14C through the check valves 15A–15C. Consequently, the air pressure within the air bags 14A–14C increase gradually. When the air pressure reaches a given value, the pressure switch 18 is closed. The closure of the pressure switch 18 is effective to cause the control unit (50–54) to reset the energization of the motor 12. This completes the establishment of the initial pressure in the air bags 14A–14C, as shown in FIG. 6a.

When one of the key switches $32_1$–$32_3$ and $31_1$–$31_5$, for example, $32_1$ is turned on, the control unit (50–54) initially establishes the closed condition of the solenoid valves 16A–16C, and reads data from memories S1-SOLA to S1-SOLC in ROM 52 to turn on these solenoid valves a number of times indicated by such data, thus opening the valves, provided the pressure switch 18 remains closed. If the pressure switch 18 is not closed, the control unit drives the motor 12 until the pressure switch 18 becomes closed before operating the solenoid valves. This operation takes place by initially energizing the solenoid valve to open the valve while simultaneously initiating a time counting operation so that the energization can be reset or the valve may be closed after 0.1 second. Then a time counting operation is resumed to energize the solenoid valve after 0.1 second. In this manner, the operation is continued in the sequence of valve open for 0.1 second—valve closed for 0.1 second—valve open for 0.1 second—. If data stored in the memory S1-SOLA is equal to 5, the solenoid valve 16A is opened five times. Similarly, the solenoid valves 16B–16C are controlled. Each time the valve is opened, the air is discharged incrementally from the air bag. In this manner when the key switch $32_1$ is closed, the data stored in the memories S1-SOLA to S1-SOLB controls the discharge of air through the solenoid valves 16A–16C, thus establishing an air pressure of a lumbar support cushioning or position which corresponds to a small value of the stature. When the key switch $31_1$ is turned on, the control of such air discharge is controlled by data read from the memories M1-SOLA to M1-SOLB of RAM 53. During the time the turn-on and -off of the solenoid valves is controlled, the number of times the solenoid valves 16A–16C has been turned on is cumulatively stored in the register SOLA to SOLC of RAM 53, respectively.

When the down specifying or relief key $34_1$ is closed, the control unit (50–54) repetitively turns the solenoid valve 16A on and off in the manner of valve open for 0.1 second and valve closed for 0.1 second as long as the key $34_1$ remains closed, and the number of times the valve is opened is cumulatively stored in the register SOLA of RAM 53. Similarly, when the down specifying or relief key $34_2$ or $34_3$ is closed, the solenoid valve 16B or 16C is repetitively turned on and off as long as the key remains closed, and the number of times the valve is opened is cumulatively stored in the register SOLB or SOLC of RAM 53. Consequently, the registers SOLA-SOLB normally maintain the number of times the air has been discharged from each of the air bags 14A–14C at any given time.

When one of the store switches $30_1$–$30_5$, for example, $30_1$, is closed, the control unit (50–54) operates to store the content of the registers SOLA-SOLB of RAM 53 into the registers M1-SOLA to M1-SOLC, respectively. When one of the switches $30_2$–$30_5$, for example, $30_i$, is closed, the content in the registers SOLA-SOLC is stored into the registers Mi-SOLA to Mi-SOLC, respectively.

As a result of the described arrangement, an operator can establish a position or cushioning of the lumbar support in the manner mentioned below. Initially, a driver who utilizes the vehicle, on which the arrangement of the invention is incorporated, for the first time closes the all-up switch 33 to establish an initial pressure in the air bags 14A–14C. He then turns on a selected one of keys $32_1$–$32_3$ depending on his stature. Specifically, key $32_1$ is turned on for a small stature, key $32_2$ for a medium stature and key $32_3$ for a large stature. A standard attitude of the lumber support is automatically established in a manner corresponding to the stature. To perform a further adjustment to the preference of the driver, key switches $34_1$–$34_3$ are suitably operated. If the driver fails to establish a desired attitude, he may depress the all-up switch 33 again to re-establish the air pressure, and then operate switches $34_1$–$34_3$ to allow a discharge of the air. After having established a desired attitude, if the operator or driver desires to use the vehicle on the same condition in future, one of the store keys $30_1$–$30_5$ is closed, thus storing the attitude thus established. The driver, who has once stored his data in one of the memories M1–M5, may close the all-up switch 33, followed by closing one of the key switches $31_i$, which is located below the store key, (one of keys $30_1$–$30_5$ is represented by $30_i$) which he has previously used for his designation. This is all that is required to establish the preselected attitude of the lumbar support in an automatic manner. If it is desired to change the attitude of the lumbar support each time the driver gets mounted on the vehicle, he may close the all-up key, directly followed by the depression of down or relief key switch $34_1$–$34_3$ for adjustment. Alternatively, the key switches $32_1$–$32_3$ and $31_1$–$31_5$ may be operated to establish the stored position before the down key switches $34_1$–$34_3$ are operated for adjustment. It is to be noted that the stored data is updated for each depression of the store key switches $30_1$–$30_5$.

Figure 7:
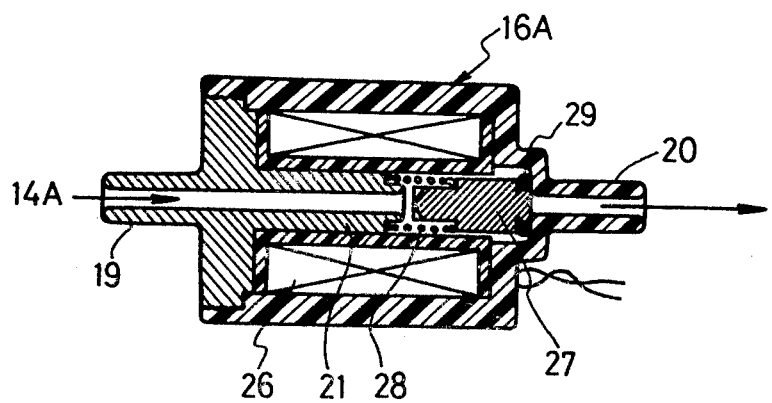
FIG. 7 is a longitudinal section of a modification of the solenoid valve.

Considering another embodiment as a modification, a solenoid valve 16A (as well as other valves 16B and 16C) may be replaced by a solenoid valve of plunger type shown in FIG. 7. The valve shown in FIG. 7 includes a movable plunger 27 formed of a magnetizable material carrying an O-ring 29 on its end which is located nearer the air output port 20. A coiled compression spring 28 urges the plunger 27 against the output port 20 with the O-ring 29 abutting against the inner surface of the valve casing adjacent to the output port 20. In this manner, the air output port 20 is closed. Hence it will be seen that when the solenoid valve 16A is replaced by the valve shown in FIG. 7, the energization of the coil 26 causes the plunger 27 to be attracted into the free end of the core 21, thus providing a communication between the input and the output port 19, 20.

As mentioned previously, in the embodiment shown in FIG. 2, the check valves 15A–15C are interposed between the air pump 13 and the air bags 14A–14C, which are disposed for communication with the atmosphere through the solenoid valves 16A–16C. Alternatively, the check valves 15A–15C may be omitted, with the solenoid valves 16A–16C interposed between the air bags 14A–14C and the air pump 13, with a solenoid switching valve interposed between the air pump and the solenoid valves so that the latter may be selectively connected to the pump 13 and to the atmosphere. When this manner is employed, the solenoid switching valve is initially rendered in communication with the atmosphere and the solenoid valves 16A–16C are turned on to discharge the air from the air bags 14A–14C, whereupon the switching valve is operated to connect the solenoid valves with the air pump 13 so that the pump 13 is driven to inject the air into the air bag 14A–14C to a given pressure during the time the solenoid valves 16A–16C remain on or by turning the latter on a number of times. Alternatively, the switching valve is operated to connect the solenoid valves with the pump, which is then driven to inject the air into the air bags to a given value by turning all of the solenoid valves 16A–16C on. Thereafter, the switching valve is operated to connect the solenoid valves with the atmosphere, thus adjusting the air pressure by energizing the valves 16A–16C for a controlled time duration or by a controlled number of times.

What we claim is:

1. An air lumbar support for a vehicle seat comprising:
   air bag means mounted in the lower portion of a seat back to vary the contour thereof;
   air pump means connected to the air bag means for supplying air to the air bag means;
   valve means coupled to the air pump means for controlling air flow from the pump means to the air bag means;
   solenoid valve means coupled to the air bag means for controlling air pressure in the air bag means; and
   an electronic control means comprising electronic processor means, key switch means and memory means storing standard attitude establishing data which indicates the timed energization of the solenoid valve means,
   said electronic control means being responsive to standard attitude establishing data upon actuation of selected key switch means by reading standard attitude establishing data and controlling the energization of the air pump means and the timed energization of the solenoid valve means for establishing an air pressure in the air bag means corresponding to the standard attitude establishing data.

2. An air lumbar support according to claim 1, wherein said valve means coupled to the air pump means comprises a check valve disposed between the air pump means and the air bag means for allowing an air flow from the air pump means to the air bag means while inhibiting an air flow from the air bag means to the air pump means, and wherein said solenoid valve means, when energized, allows discharge of air in the air bag means and interrupts the discharge when deenergized.

3. An air lumbar support according to claim 2, wherein said electronic control means, for establishing an air pressure in the air bag means corresponding to the standard attitude establishing data, at first energizes the air pump means for supplying air to the air bag means up to a predetermined pressure, and then energizes the solenoid valve means in accordance with establishing data.

4. An air lumbar support for a vehicle seat comprising:
   air bag means adapted to be mounted in the lower portion of a seat back to vary the contour thereof;
   air pump means adapted to supply air to the air bag means;
   valve means coupled to the air pump means for controlling air flow from the pump means to the air bag means;
   solenoid valve means coupled to the air bag means for controlling air pressure in the air bag means; and
   an electronic control means comprising electronic processor means, key switch means and memory means,
   said electronic control means being responsive to actuation of said key switch means for changing air pressure in the air bag means by controlling the energization of the air pump means and the timed energization of the solenoid valve means,
   said electronic control means, after the energization of the solenoid valve means, forming actual attitude data which indicates the timed energization of the solenoid valve means, and memory means for storing the actual attitude data upon actuation of a selected key switch means at a predetermined address;
   and
   said electronic control means being responsive to the actuation of a selected key switch means for reading the actual attitude data at the predetermined address of the memory means and controlling the energization of the air pump means and the the timed energization of the solenoid valve means for establishing an air pressure corresponding to the actual attitude data in the air bag means.

5. An air lumbar support according to claim 4, wherein said valve means coupled to the air pump means comprises check valve means disposed between the air pump means and the air bag means for allowing an air flow from the air pump means to the air bag means while inhibiting an air flow from the air bag means to the air pump means, and wherein said solenoid valve means, when energized, allows discharge of air in the air bag means and interrupts the discharge when deenergized.

6. An air lumbar support according to claim 5, wherein said electronic control means, for establishing an air pressure corresponding to the actual attitude data in the memory means, at first energizes said air pump means for supplying air to said air bag means up to a predetermined pressure, and then energizes said solenoid valve means in accordance with the actual data.

7. An air lumbar support for a vehicle seat comprising:
   air bag means adapted to be mounted in the lower portion of a seat back to vary the contour thereof;
   air pump means adapted to supply air to the air bag means;
   valve means coupled to the air pump means for controlling air flow from the pump means to the air bag means; and
   an electronic control means comprising electronic processor means, key switch means and memory means storing standard attitude establishing data which indicates timed energization of the solenoid valve means,
   said electronic control means being responsive to standard attitude establishing data upon actuation of the selected key switch means by reading standard attitude establishing data and controlling the energization of the air pump means and the timed energization of the solenoid valve means for establishing an air pressure in the air bag means corresponding to the standard attitude establishing data,
   said electronic control means being responsive to adjusting air pressure in the air bag means by controlling the energization of the air pump means and the timed energization of the solenoid valve means upon actuation of selected key switch means, said electronic control means, after adjusting the air pressure by energization of the solenoid valve means, forming actual attitutde data which indicates timed energization of the solenoid valve means and memory means for storing the actual attitude data upon actuation of selected key switch means at a predetermin-d address, and said electronic control means being responsive to actuation of selected key switch means for reading the actual attitude data at the predetermined address of the memory means and controlling the energization of the air pump means and the timed energization of the solenoid valve means for establishing an air pressure corresponding to the actual attitude data in the air bag means.

8. An air lumbar support according to claim 7, wherein said valve means coupled to the air pump means comprises check valve means disposed between the air pump means and the air bag means for allowing an air flow from the air pump means to the air bag means while inhibiting an air flow from the air bag means to the air pump means, and wherein the solenoid valve means, when energized, allows discharge of air from the air bag means and interrupts the discharge when deenergized.

9. An air lumbar support according to claim 8, wherein said electronic control means, for establishing an air pressure in the air bag means corresponding to the standard attitude establishing data, at first energizes the air pump means for supplying air to the air bag means up to a predetermined pressure, and then energizes the solenoid valve means in accordance with the standard attitude establishing data, and wherein said electronic control means, for establishing an air pressure corresponding to the actual attitude data in said memory means, at first energizes the air pump means for supplying air to the air bag means up to a predetermined pressure, and then energizes the solenoid valve means in accordance with the actual attitude data.

* * * * *